Patented Apr. 6, 1948

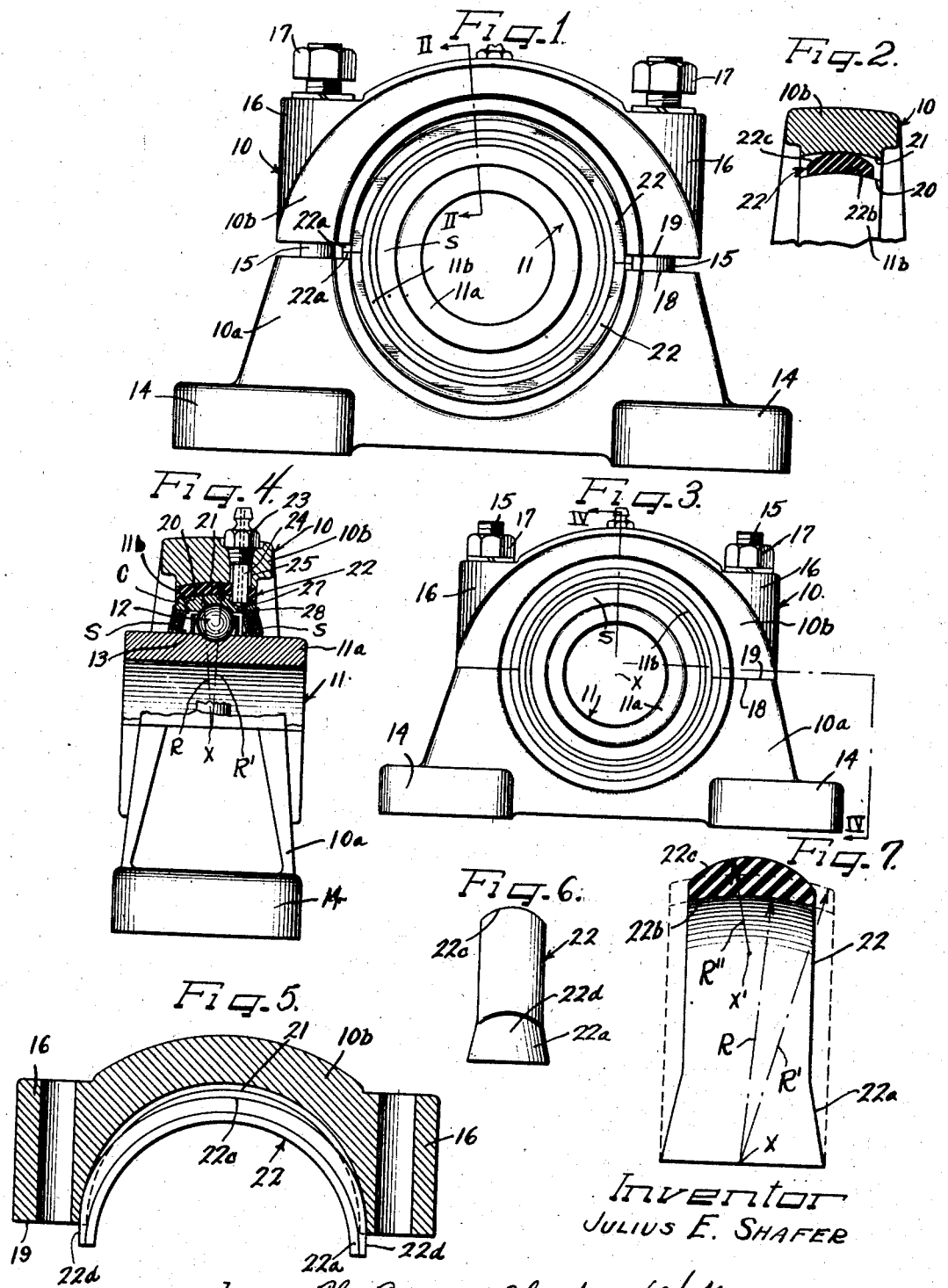
April 6, 1948. J. E. SHAFER 2,439,267
RESILIENTLY MOUNTED BEARING
Filed Feb. 23, 1945
Inventor
JULIUS E. SHAFER
by The Firm of Charles W. Hills Attys.

2,439,267

UNITED STATES PATENT OFFICE 2,439,267

RESILIENTLY MOUNTED BEARING

Julius E. Shafer, Chicago, Ill.

Application February 23, 1945, Serial No. 579,349

7 Claims. (Cl. 308—184)

This invention relates to mountings for bearings and the like wherein resiliently deformable bushings are utilized for accommodating relative movements between the parts.

Specifically, this invention deals with self-aligning bearings mounted in rubber bushings for eliminating heretofore required finish ground bearing walls to accommodate the self-aligning movements of the bearings.

This invention will hereinafter be specifically described as embodied in a pillow block-carried sealed ball bearing unit, but it should be understood that the invention is generally applicable to resiliently mounted self-aligning members.

This invention utilizes rubber as a non-compressible flowable material which will flow from a region of high pressure to any available region of low pressure until forces are equalized by elastic stresses set up in the material.

In accordance with this invention the flow of rubber is regulated and confined for urging the bearing into a central position while permitting tilting movements of the bearing from this position. The rubber is confined between rigid surfaces but has unconfined edges which can be deformed to accommodate the self-aligning movements.

Since the major area of the rubber bushing is confined, preferably in a deformed preloaded condition, the rubber has a high form factor making it possible to subject the bushing to higher loads without deforming the rubber beyond its elastic limits. The preloading of the rubber bushing will eliminate a mushy, soft mounting for the bearing.

In the preferred embodiment of the invention, the rubber bushing is composed of two segmental rings, the pillow block is composed of a base and a yoke or strap cooperating therewith to form a circular transversely concave inner mounting wall, and the bearing has a circular transversely convex mounting wall. Each of the rubber rings, in its free state, is narrower than the mounting walls of the pillow block and bearing and is crowned to have a thick central portion. In addition, each rubber ring is preferably provided with a fantail end having a reduced crown so that the ends of the ring are wider but thinner than the body of the ring.

The two rings abut to form a circle with a transversely concave inner wall snugly receiving the outer wall of the bearing unit. The crown of the bushing has a different contour than the mounting wall of the split pillow block, so that the base and yoke of the pillow block must be drawn together for deforming the bushing crown into conformity with this mounting wall. This deformation of the crown effects a preloading of the bushing and increases the width of the bushing to the width of the mounting walls.

The preloaded bushing is confined except at the edges thereof and the load on the fantail ends of the bushing rings is the same as the load on the main body of the bushing because the thinner ends are wider to supply the same amount of rubber as the crown. The flattened crown permits the rings to fit further into the pillow block base and yoke. The increased width of the fantail ends compensates for the decreased thickness of these ends so that the deformed preloaded bushing will have a uniform width.

The outer race ring of the bearing and the inner mounting wall of the pillow block are arcs of a circle struck from the same center. The rubber bushing interposed between the wall surfaces is deformable and, since it is shaped to be uniformly loaded, the bearing will be carried for tilting movement about the same center as the radii of the race ring and pillow block. The bearing is therefore self-aligning but the rubber bushing tends to urge the bearing back to its original position.

It is, then, an object of this invention to provide a resiliently mounted self-aligning bearing assembly.

A further object of the invention is to provide a preloaded rubber-bushed bearing construction which will withstand heavy loads without deteriorating and will automatically center the bearing while accommodating limited tilting movements thereof.

A further object is to provide a pillow block-carried sealed bearing assembly with rubber bushings so shaped, in their free state, as to center the bearing in the pillow block when they are deformed to produce a preloaded resilient mounting with a high form factor.

A still further object of this invention is to provide a split pillow block and bearing unit assembly with a rubber bushing that eliminates the necessity for finish-grinding the bearing-carrying wall of the pillow block without interfering with the self-aligning properties of the pillow block.

A specific object of this invention is to provide rubber bushings for pillow blocks, and to so shape these bushings that bearings carried thereby in the pillow blocks will tilt about a predetermined center point without the necessity for finish-grinding the bearing-carrying wall of the pillow block.

Other and further objects of this invention will be apparent to those skilled in the art from the following detailed description of the annexed sheet of drawings which, by way of preferred example, illustrates one embodiment of the invention.

On the drawings:

Figure 1 is a front elevational view of a split pillow block and sealed bearing unit equipped with a rubber bushing according to this invention and illustrating the manner in which the rubber bushing, in its free state, holds the two parts of the pillow block in spaced relation.

Figure 2 is a fragmentary transverse cross-sectional view taken along the line II—II of Figure 1.

Figure 3 is a view similar to Figure 1 but illustrating the pillow block sections in abutting operative relationship for preloading the rubber bushing.

Figure 4 is a transverse cross-sectional view, with parts in elevation, taken along the line IV—IV of Figure 3 and illustrating the preloaded and deformed rubber bushing.

Figure 5 is a longitudinal cross-sectional view of the top half of the pillow block and illustrating, in elevation, the manner in which the rubber bushing fits into the pillow block in its free state.

Figure 6 is an end elevational view of a bushing ring segment according to this invention.

Figure 7 is a somewhat enlarged vertical cross-sectional view of the ring segment of Figure 6 and illustrating, in dotted lines, the position assumed by the ring when it is preloaded for use.

As shown on the drawings:

In Figures 1 to 4, the reference numeral 10 designates generally a pillow block carrying a sealed bearing unit 11. The pillow block is composed of a base part 10a and a top yoke part 10b.

The bearing unit 11 is composed of an inner race ring 11a with a groove around the periphery thereof providing a raceway and an outer race ring 11b with a groove around the inner periphery thereof providing a raceway. A row of balls 12 is seated in the grooves of the inner and outer race rings 11a and 11b and the balls held in spaced relation by a cage 13. Seals S are carried by the race rings on opposite sides of the cage 13 to provide a sealed bearing chamber C.

The base 10a of the pillow block has feet 14 thereon adapted to receive mounting studs (not shown) therethrough for fixedly securing the base in position.

Studs 15 project upwardly from the top face of the base 10a and the strap or yoke 10b has hollow bosses 16 receiving these studs. The upper ends of the studs are threaded and receive nuts 17 thereon. The top of the base 10a and the bottom of the yoke 10b have mating faces 18 and 19 respectively.

The outer race ring 11b of the bearing unit 11 has a convex transversely arcuate outer wall 20 struck from a radius R centered at X.

The inner faces of the pillow block base 10a and yoke 10b have a concave transversely arcuate inner wall 21 struck from a radius R' centered on the same center point X as the radius R for the outer wall 20.

The convex wall 20 and the concave wall 21 are thus concentric curved circles with the wall 20 in spaced radial relation from the wall 21.

In the conventional pillow block and bearing assembly the walls 20 and 21 are in bearing engagement so that the bearing can tilt about the center X. In this construction, however, it is necessary that the walls be finish-ground to provide good bearing surfaces.

In accordance with this invention, a rubber bushing, composed of a pair of ring segments 22, is provided between the walls 20 and 21 for resiliently mounting the bearing 11 in the pillow block 10. The bushing, as will be hereinafter more fully explained, eliminates the necessity for finish-grinding the walls 20 and 21, and especially the wall 21, without shifting the center for the bearing 11 and without interfering with the self-aligning properties of the bearing.

Each ring segment 22, in its free state as best shown in Figures 2, 6 and 7, is narrower than the walls 20 and 21. However, the free end portions of the ring segments are fantailed outwardly as at 22a to provide end edges having the same width as the walls 20 and 21. These fantailed portions 22a are of reduced thickness for a purpose to be hereinafter described.

As shown in Figure 7, the ring segment 22, in its free state, has a concave transversely arcuate inner wall 22b struck from the same radius R as the wall 20 of the race ring 11b. This wall 22b thus snugly fits on the wall 20.

The ring segment 22, however, has a convex transversely arcuate outer wall 22c struck from a much shorter radius R'' having a center X', different from the center X for the radii R and R'. As a result, the ring 22 has a crown providing a thickened portion intermediate the side edges of the ring. This crowned wall 22c will not mate with the wall 21 of the pillow block but, as shown in Figure 5, in order that the ring segment 22 will fit substantially into the pillow block, each fantailed end 22a thereof has a somewhat flattened crown 22d. This flattened crown 22d permits the ring segments to extend further into the yoke section 10b of the pillow block and also into the base 10a of the pillow block but end portions of the rings 22 will extend beyond the mating faces 18 and 19 of the pillow block portion as shown in Figure 1.

When the nuts 17 are tightened on the studs 15 to draw the faces 18 and 19 into the mating positions shown in Figures 3 and 4, the bushing rings 22 are deformed into conformity with the walls 20 and 21. Thus, as shown in Figure 7, the crowned outer wall 22c is flattened and the ring is increased in width to the dotted line position.

As best shown in Figure 4, the bushing 22 is confined except at its edge faces which are extended flush with the faces of the pillow block and bearing ring. Since the crown of the outer wall 22c is flattened into conformity with the wall 21 of the pillow block, the extended end 22a of the ring segments 22 are automatically drawn into flush relationship with the mating faces 18 and 19 of the pillow block portion. The fantail ends 22a, being thinner than the remaining portions of the ring segments, are merely deformed to have straight end edges. The relationship of the increased width provided by the fantailed ends and the decreased thickness of these ends is such that the loaded bushing will have a uniform width and a uniform stress around its entire circumference.

The preloaded bushing, being confined by the walls 20 and 21 except at the narrow end edges thereof, will have a high form factor since the unconfined areas are relatively small as compared with the total surface area of the bushing. The form factor of a rubber bushing is the ratio of the loaded surfaces to the total surface, and a high form factor is desirable because the bushing will be deformed under load to a much lesser degree than a bushing with a low form factor.

As a result of the uniform loading of the bushing because of the design of the bushing segments, and, as a result of the high form factor of the loaded bushing, the same tilting center X will be maintained for the bearing 11. The bearing 11 will be self-aligning because interparticle flow of the rubber will permit tilting of the bearing relative to the pillow block but as soon as tilting loads are released, the bearing will automatically return to its initial straight position.

The bearing chamber C containing the ball bearings 12 can receive lubricant from a fitting 23 threaded into the pillow block yoke 10b. A hollow pin 24 is loosely seated in a bore 25 provided in this yoke and extends through the rubber bushing 22 into a dimple 27 formed in the race ring 11b. A small-diameter bore 28 connects the bottom of the dimple 27 with the chamber C.

The pin 24 can wobble in the hole 25 and in the dimple 27 to accommodate the above-described self-aligning movements of the bearing 11 relative to the pillow block 10 while maintaining the fitting 23 in communication with the chamber C.

The term "rubber" is used throughout the specification and in the claims in its broad sense to include synthetic rubbers and resilient deformable plastic materials as well as natural rubber. For grease and oil resistance, synthetic rubbers such as "neoprene" are desired.

From the above description it should be understood that this invention provides a resiliently mounted self-aligning bearing assembly which maintains a predetermined center for the bearing and firmly carries the bearing. The resilient mounting is preloaded and has a high form factor to resist but not prevent deformation beyond the preloaded condition. Since the resilient material is always maintained under compressive load, it will have a prolonged wear life.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The combination with a bearing unit having a convex transversely arcuate outer wall and a housing having a concave transversely arcuate inner wall surrounding the outer wall of the bearing unit and struck from a radius having the same center as said outer wall of the bearing unit, of a resilient bushing between said walls, said bushing, in its free state being narrower than said walls and having a crowned outer wall of shorter radius than the radius of said inner wall of the housing, and said bushing being preloaded into conformity with said outer wall of the bearing and said inner wall of the housing to mount the bearing unit for tilting movement about said center.

2. The combination with a bearing unit having a convex transversely arcuate outer wall and a split housing with a concave transversely arcuate inner wall surrounding said outer wall of the bearing, of a bushing between said walls composed of a pair of resilient rubber ring segments, each ring segment in its free state being narrower than said walls and having a concave inner wall contoured to fit the outer wall of the bearing together with a convex outer wall with an arcuate crown of shorter radius than the radius of the inner wall of the housing, and said ring segments having fantailed abutting end portions with flattened crowns arranged for cooperating with the remaining portion of the ring segments to center the bearing when the crown portions thereof are deformed into conformity with the inner wall of the housing.

3. A self-aligning bearing assembly comprising a split pillow block having a concave mounting wall, a bearing unit in said pillow block having a convex outer wall, and a rubber bushing between said inner wall of the pillow block and said outer wall of the bearing unit deformed into conformity with said walls from a thickened narrow free state form having a crowned outer wall with a short radius and a concave inner wall snugly fitting the convex outer wall of the bearing to provide a preloaded bushing having a high form factor for resisting further deformation without preventing tilting of the bearing.

4. A bushing for resiliently mounting a bearing in a pillow block which comprises a semi-circular ring having an inner concave arcuate wall struck from a long radius and an outer convex arcuate wall struck from a short radius together with fantail end portions of thinner cross section than the body of the ring segment.

5. A bushing for resiliently mounting a bearing in a pillow block to tilt about a fixed center which comprises a pair of rubber rings having concave inner walls struck from long radii and convex outer walls struck from short radii, said rings having fantail end portions of reduced thickness in abutting relation and said rings being deformable into conformity with the outer wall of the bearing and the inner wall of the pillow block to uniformly load the rubber while maintaining a fixed center of tilt for the bearing.

6. A bearing assembly comprising a pillow block base, a pillow block yoke coacting with said base, said base and yoke cooperating to define a circular concave mounting wall, means for drawing said yoke toward said base to mount the yoke in fixed position on the base, a bearing unit having an outer race ring with a convex outer wall surrounded by the concave mounting wall of the base and yoke, and a rubber bushing between said concave mounting wall and said convex outer wall and being thicker in its free state than the space between said walls, said bushing having blunt end faces in its free state inwardly from the sides of the base and yoke and outer race ring of the bearing whereby said means for drawing the yoke toward the base will radially load the bushing into a thinner shape in conformity with the concave mounting wall and the convex outer wall of the bearing while spreading the end faces of the bushing laterally.

7. The combination with a bearing unit having an outer race ring with a circular convex outer wall and a pillow block having a circular concave inner mounting wall surrounding said outer wall of the bearing, of a rubber bushing between said walls having in its free state a concave inner surface snugly fitting the outer wall of said bearing and a crowned outer wall of short radius providing a thickened central portion, and means for radially loading the bushing while allowing it to spread laterally between said walls for locking the bearing in the pillow block to tilt about a fixed center only.

JULIUS E. SHAFER.

REFERENCES CITED

The following references are of record in the file of this patent:

UNITED STATES PATENTS

| Number | Name | Date |
| --- | --- | --- |
| 1,732,657 | Picquerez | Oct. 22, 1929 |
| 2,081,237 | Jantsch | May 25, 1937 |
| 2,138,659 | Kindig | Nov. 29, 1938 |
| 2,189,117 | Prentice | Feb. 6, 1940 |